(12) United States Patent
Baron et al.

(10) Patent No.: US 10,325,348 B2
(45) Date of Patent: Jun. 18, 2019

(54) METHOD AND SYSTEM FOR GENERATION OF VECTOR GRAPHICS

(71) Applicant: Mastercard International Incorporated, Purchase, NY (US)

(72) Inventors: Joshua J. Baron, Hoboken, NJ (US); Murugalakshmanan Mariappan, New York, NY (US); Jason Eckert, Deer Park, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 51 days.

(21) Appl. No.: 15/791,828

(22) Filed: Oct. 24, 2017

(65) Prior Publication Data

US 2019/0122333 A1    Apr. 25, 2019

(51) Int. Cl.
*G06T 3/40*     (2006.01)
*G06F 16/56*    (2019.01)
*G06F 16/51*    (2019.01)

(52) U.S. Cl.
CPC ............... *G06T 3/40* (2013.01); *G06F 16/56* (2019.01); *G06F 16/51* (2019.01)

(58) Field of Classification Search
CPC ...................................................... G06T 3/40
See application file for complete search history.

(56) References Cited

U.S. PATENT DOCUMENTS

| 8,773,423 | B2 | 7/2014 | Sun et al. | |
| 8,913,300 | B2 | 12/2014 | Hernandez | |
| 2004/0111672 | A1* | 6/2004 | Bowman | G06F 9/451 715/234 |
| 2008/0275903 | A1* | 11/2008 | Kent | G06T 11/60 |
| 2014/0320540 | A1* | 10/2014 | Deach | G06T 3/40 345/666 |
| 2017/0032492 | A1* | 2/2017 | Block | G06T 3/40 |

* cited by examiner

*Primary Examiner* — Ryan R Yang
(74) *Attorney, Agent, or Firm* — Buchanan Ingersoll & Rooney PC

(57) ABSTRACT

A method for generating a plurality of vector images with specified dimensions includes: storing a composite image comprised of one or more base vector graphics images; receiving a data file from an external computing system, wherein the data file includes a plurality of dimensional data sets, each dimensional data set comprising at least a length and a height; parsing the received data file to identify each of the plurality of dimensional data sets and the associated length and width; generating a vector graphics image file for each of the plurality of dimensional data sets, wherein the vector graphics image file comprises an image based on the stored composite image and has dimensions based on the length and height associated with the respective dimensional data set; and transmitting the generated vector graphics image file for each of the plurality of dimensional data sets to the external computing system.

16 Claims, 6 Drawing Sheets

METHOD AND SYSTEM FOR GENERATION OF VECTOR GRAPHICS

FIELD

The present disclosure relates to the generation of vector graphics for display on an electronic display, specifically the generation of a plurality of vector graphical images based on dimensions submitted in a received data file, wherein the vector graphics may be subject to the incorporation of additional subject matter.

BACKGROUND

Entities may utilize graphical images for any number of purposes. For instance, a company may have a button or other type of Graphic User Interface (GUI) or logo placed on their website, a sponsor's logo may be included in promotional materials, signage at an event may display logos or trademarks of exhibitors or attendees, etc. In many cases, the area in which the owner or operator of the media wants to display an image may be different from the size of the image furnished by the image provider. For example, a webpage may have a specific area laid out for a button, while the company that is to provide the image to serve as the button may not have one available with those dimensions.

In such cases, either the operator of the webpage must modify the page to accommodate the dimensions of the provided image, or the image provider must generate a new image that meets the dimensions required by the web layout. In the former case, it may be exceedingly difficult, or even impossible, to modify the layout of a web page to accommodate a differently sized image. In the latter case, it may require significant time and effort on the part of the image provider involving a laborious process of graphics designers interacting with a design program to create a new image of specific dimensions that has the proper proportions, look and feel for maintaining a desired impression on a user such as desirable with the use of trademarks having design elements. Often there are parameters such as height and width ratios, that cannot be exceeded, color ratios, relative spacing, fonts, or other parameters that are imposed to maintain a look and feel of a trademark or other design element. This is particularly so in instances where the image provider may be providing images to a large number of webpage operators, such as a payment network providing checkout buttons to millions of different websites for a payment method as one of many examples. Such a process may be even more cumbersome if the operator or a third party wants to incorporate additional subject matter into the image. In such cases, even if a preexisting image matches the dimensions, a new image must be created to incorporate this subject matter while maintaining proportionality, look and feel of individual design elements, further increasing the time and resources necessary to accommodate. Though the existing technology is adequate to allow for the designing process to proceed, it lacks the ability to assist the users in maintaining the proper proportionality, look and feel of the overall and individual design elements of a given graphical design.

Thus, there is a need for a technical solution to improve the current technology used in the process of the generation of images of varying dimensions.

SUMMARY

The present disclosure provides a description of systems and methods for generating a plurality of vector images with specified dimensions. A data file is supplied that has a plurality of dimensional data sets, each specifying at least the length and height of a requested image. The data file is parsed to identify these dimensional data sets, and then vector graphical images are generated to match each of the supplied dimensions from a base vector graphical image. In cases where additional subject matter is supplied, such subject matter may be incorporated in the generated vector graphical images. As a result, an entity may obtain a plurality of customized vector graphics via an automated process that can accommodate the needs of webpages and other graphical design implementations without requiring the image provider to do any more than supplying the base vector graphic.

A method for generating a plurality of vector images with specified dimensions includes: storing, in a memory of a processing server, a composite image comprised of one or more base vector graphics images; receiving, by a receiving device of the processing server, a data file from an external computing system, wherein the data file includes a plurality of dimensional data sets, each dimensional data set comprising at least a length and a height; parsing, by a parsing module of the processing server, the received data file to identify each of the plurality of dimensional data sets and the associated length and height; generating, by an image processing module of the processing server, a vector graphics image file for each of the plurality of dimensional data sets, wherein the vector graphics image file comprises an image based on the stored composite image and has dimensions based on the length and height associated with the respective dimensional data set; and electronically transmitting, by a transmitting device of the processing server, the generated vector graphics image file for each of the plurality of dimensional data sets to the external computing system.

A system for generating a plurality of vector images with specified dimensions includes: a memory of a processing server configured to store a composite image comprised of one or more base vector graphics images; a receiving device of the processing server configured to receive a data file from an external computing system, wherein the data file includes a plurality of dimensional data sets, each dimensional data set comprising at least a length and a height; a parsing module of the processing server configured to parse the received data file to identify each of the plurality of dimensional data sets and the associated length and height; an image processing module of the processing server configured to generate a vector graphics image file for each of the plurality of dimensional data sets, wherein the vector graphics image file comprises an image based on the stored composite image and has dimensions based on the length and height associated with the respective dimensional data set; and a transmitting device of the processing server configured to electronically transmit the generated vector graphics image file for each of the plurality of dimensional data sets to the external computing system.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Automated Generation of Vector Graphical Images

Figure 1:
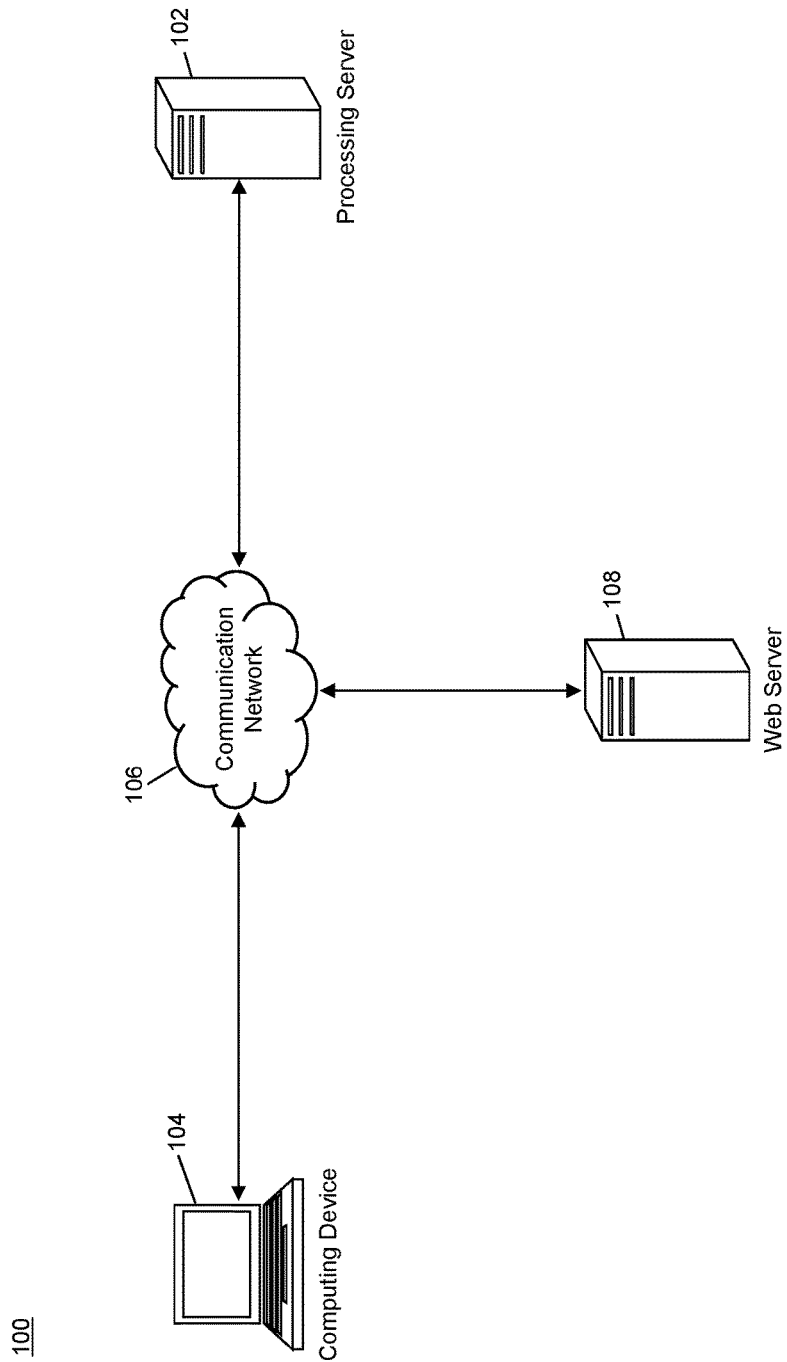
FIG. 1 is a block diagram illustrating a high level system architecture for automatically generating customized vector images in accordance with exemplary embodiments.

FIG. 1 illustrates a system 100 for the automated generation of a plurality of vector graphical images based on a data file of supplied dimensional data sets.

The system 100 may include a processing server 102. The processing server 102, discussed in more detail below, may be configured to automatically generate vector images of specified length and height. As discussed below, the processing server 102 may be a computing system that is specifically configured to perform the functions discussed herein. In the system 100, a computing device 104 may submit a data file to the processing server 102. The computing device 104 may be any type of computing device suitable for performing the functions discussed herein, such as a desktop computer, laptop computer, notebook computer, tablet computer, cellular phone, smart phone, smart watch, smart television, etc. In some embodiments, the computing device 104 and processing server 102 may establish a direct communication channel for the exchange of data, such as via near field communication, Bluetooth, radio frequency, serial connection, etc. In other embodiments, the processing server 102 and computing device 104 may communicate via a communication network 106. The communication network 106 may be any type of network suitable for exchanging data communications between the processing server 102 and the computing device 104, such as the Internet, a cellular communication network, a local area network, etc.

The computing device 104 may submit the data file to the processing server 102, either directly or via the communication network 106, where the data file comprises a request for a plurality of vector images. The data file may be any suitable type of data file, such as a comma separated value file. The data file may include a plurality of dimensional data sets, wherein each dimensional data set includes at least a length and a height. The processing server 102 may parse the data file to identify each of the dimensional data sets included therein and the respective lengths and heights. The processing server 102 may then generate a vector graphical image for each of the dimensional data sets. Each generated vector graphical image may have a length and height matching the length and height included in the respective dimensional data set. For instance, the data file may include a dimensional data set for an image with a length of 150 pixels and a height of 30 pixels, where the processing server 102 may generate a vector image of 150×30 pixels.

Vector images may utilize geometrically associated points and lines with associated colors to define the image, rather than pixel-based definitions of colors used in traditional computer-based graphic images. Additional detail regarding vector images can be found in, for instance, U.S. Pat. No. 8,913,300, issued on Dec. 16, 2014, and U.S. Pat. No. 8,773,423, issued on Jul. 8, 2014, which are herein incorporated by reference in their entirety.

Vector images generated by the processing server 102 may be based on one or more base vector images, which may serve as a template for the generated vector images. For instance, the computing device 104 may be requesting a plurality of vector images of a specific logo to serve as buttons for a web page. The base vector image may be an image comprising the specific logo and a border. Vector images generated therefrom may thus maintain the border, which may be stretched along the sides as needed, with the logo placed in the middle of the generated image, and may be adjusted to increase or decrease the size while retaining the aspect ratio. The processing server 102 may utilize various image processing techniques for orientating and/or adjusting the base vector image(s) to generate the new vector images, such as slicing, tiling, filling, stretching, etc. In some cases, the type of technique used may be based on the base vector images being used, which may be specified by the supplier of the base vector image(s). For example, a payment network that supplies a base vector image to be used for buttons for an associated payment method may specify that only slicing (e.g., separating the base vector image into a predetermined number of areas and repositioning, stretching, and/or filling indicated areas accordingly) may be used to generate a vector image using its logo. In other cases, the computing device 104 may specify, in the data file or an accompany request, the image processing technique to utilize in generating the new vector images.

In some embodiments, the processing server 102 may utilize one or more design rules with respect to generating the new vector images. Design rules may be specified by the supplier of the one or more base images, and may be rules that affect the generation of the vector images. For instance, design rules may include rules regarding the aspect ratio of the vector images (e.g., must be one of a predetermined number of ratios), aspect ratio of supplied images for inclusion in the vector image, color values and/or ranges of the supplied image(s), position of the supplied image in the vector image, orientation of any portion of the base image with respect to supplied image(s), restrictions on the use of trademarked images, etc. In some cases, the processing server 102 may be configured to modify a dimensional data set and/or supplied image to conform with design rules. For example, the processing server 102 may adjust a length and/or height of a dimensional data set to the closest value that satisfies a specified aspect ratio set forth in the design rules.

Once the vector images have been generated, the processing server 102 may electronically transmit them to the computing device 104 via the communication network 106. In some embodiments, the system 100 may include a web server 108, which may be configured to host the vector images. For instance, the processing server 102 may electronically transmit the vector images to the web server 108 via the communication network 106. The web server 108 may host the images, and one or more uniform resource locators (URLs) provided for access to the images. The URLs may be provided to the processing server 102 for forwarding to the computing device 104, or may be directly provided to the computing device 104 by the web server 108 (e.g., based on communication data provided to the web server 108 by the processing server 102). The computing device 104 may then access the vector images to utilize them in any manner they see fit, such as for hosting on their own web pages, inclusion in promotional materials or signage, etc.

In some embodiments, the processing server 102 or web server 108 may be configured to generate an archive of the vector images. For instance, the processing server 102 may generate ten different vector images (e.g., for ten dimensional data sets included in the supplied data file), which may then be incorporated into a single archived data file, such as in a ZIP or RAR file format. This archived data file may be provided to the computing device 104 in place of the vector images, which may be extracted by the computing device 104 using appropriate techniques.

In some embodiments, the computing device 104 may supply one or more images to be included in the generated vector images. For instance, the computing device 104 may be operated by an entity that has a logo they want to include in the vector images generated by the processing server 102. In such embodiments, the data file submitted by the computing device 104 may include or be accompanied by an image file. In some instances, the image may be a vector image. In some cases, the computing device 104 may also specify (e.g., in the data file or separate file and/or transmission) image processing techniques to be applied to the image, such as specifications regarding slicing or stretching of the image. In some instances, the computing device 104 may also specify orientation of the supplied image with respect to the generated vector images (e.g., how the supplied logo may be display along with the logo from the base image). In other instances, orientation may be predetermined by the processing server 102, such as where the base image may include an area predefined for supplied images. The processing server 102 may generate the vector images having the specified dimensions, where the image file supplied by the computing device 104 may be incorporated into the generated vector images. In such embodiments, the computing device 104 may be supplied with automatically generated vector images that are not only of specified dimensions, but also incorporate supplied subject matter.

The methods and systems discussed herein enable a plurality of vector images to be automatically generated based on dimensional data sets included in a data file, including vector images that may incorporate additional subject matter. As a result, the computing device 104 may quickly and efficiently receive a plurality of customized vector images, which the computing device 104 may use having customized specifications. At the same time, the processing server 102 may be able to automatically generate the plurality of customized vector images more quickly and efficiently than manually created images, which may dramatically decrease the number of resources expended by the processing server 102, particularly when a vast number of images may be requested.

Processing Server

Figure 2:
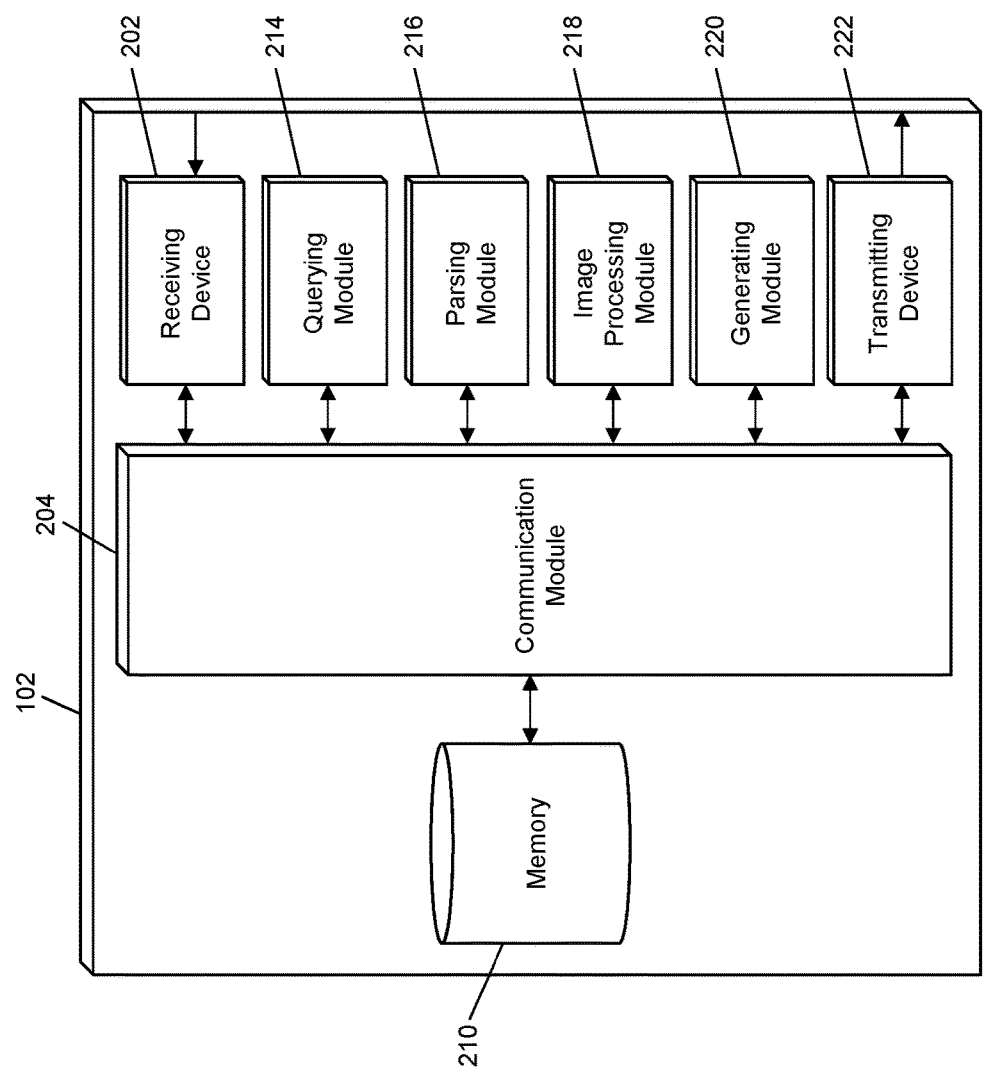
FIG. 2 is a block diagram illustrating the processing server of the system of FIG. 1 for the automatic generation of customized vector images in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from computing devices 104, web servers 108, and other systems and entities via one or more communication methods, such as near field communication, physical contact points, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 104, which may be superimposed or otherwise encoded with data files, which may include a plurality of dimensional data sets comprised of at least a length and a height. In some instances, the data file may further include or be accompanied by image processing specifications and/or an additional image file. In some embodiments, the receiving device 202 may also be configured to receive data signals electronically transmitted by web servers 108, which may be superimposed or otherwise encoded with URLs corresponding to vector image files and/or archives files hosted by the web server 108.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, parsing module 216, image processing module 218, generating module 220, etc. As used herein, the term "module" may be software that when executed on hardware the hardware becomes a particularly programmed computer to receive an input, perform one or more processes using the input, and provides an output. The input, output, and processes performed by various modules will be apparent to one skilled in the art based upon the present disclosure.

The processing server 102 may also include a memory 210. The memory 210 may be configured to store data for use by the processing server 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein.

The memory 210 may be configured to store one or more image files, which may be used as base images for vector graphics generated by the processing server 102 as part of the functions discussed herein. The memory 210 may also be configured to store program code for execution by the modules and engines of the then specifically configured processing server 102 for performing the functions discussed herein, such as for image processing and the generation of archive files. In embodiments where design rules may be specified for base images, the memory 210 may also be configured to store design rules and data associated therewith.

The processing server 102 may include a querying module 214. The querying module 214 may be configured to execute queries on databases to identify information. The querying module 214 may receive one or more data values or query strings, and may execute a query string based thereon on an indicated database, such as the memory, to identify information stored therein. The querying module 214 may then output the identified information to an appropriate engine or module of the processing server 102 as necessary. The querying module 214 may, for example, execute a query on the memory 210 to identify one or more base image files to be used in the generation of vector images based on supplied dimensional data sets.

The processing server 102 may also include a parsing module 216. The parsing module 216 may be configured to receive data as input, may parse the received data to identify data included therein, and may output the resulting data to one or more modules or engines of the processing server 102. The parsing module 216 may, for example, be supplied a data file (e.g., received by the receiving device 202) as input, and may parse the data file to identify the plurality of dimensional data sets included therein. In some instances, the parsing module 216 may also parse one or more image files from the received data file. In some such instances, the parsing module 216 may parse additional data from the received data file, such as dimensions, colors, or aspect ratios of the one or more image files, or other data that may be associated with design rules specified for the vector images to be generated.

The processing server 102 may also include an image processing module 218. The image processing module 218 may be configured to perform image processing techniques for the generation of vector images as discussed herein. The image processing module 218 may be configured to generate new vector images, modify existing vector images, and otherwise process images to generate a vector image from one or more base images that has a specified length and height corresponding to a dimensional data set parsed from the received data file. In some cases, the image processing module 218 may use specific image processing techniques as specified by the processing server 102 or in the data file. For instance, the base image file(s) and/or any supplied image files may be stretched, sliced, tiled, filled, etc. to generate a vector image having the specified dimensions. The vector images generated by the image processing module 218 may be of any suitable format, such as a scalable vector graphics file format or an encapsulated postscript vector graphics file format. In instances where design rules may be specified for the vector images, the image processing module 218 may be configured to generate the vector images to comply with the specified design rules.

The processing server 102 may also include a generating module 220. The generating module 220 may be configured to generate data for use by the processing server 102 in performing the functions discussed herein. The generation module 220 may receive instructions as input, may generate data based on the instructions, and may output the generated data to another module or engine of the processing server 102. The generation module 220 may, for instance, be configured to generate an archived data file comprised of a plurality of vector images.

The processing server 102 may also include a transmitting device 222. The transmitting device 222 may be configured to transmit data over one or more networks via one or more network protocols. In some instances, the transmitting device 222 may be configured to transmit data to computing devices 104, web servers 108, and other entities via one or more communication methods, such as near field communication, physical contact points, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to computing devices 104 and/or web servers 108 that are superimposed or otherwise encoded with vector image files and/or an archive data file comprised of vector image files. In some instances, the transmitting device 222 may be configured to electronically transmit data signals superimposed or otherwise encoded with one or more URLs, which may be directed to vector image files and/or archived data files.

Process for Automatic Generation of Vector Graphic Images

Figure 3:
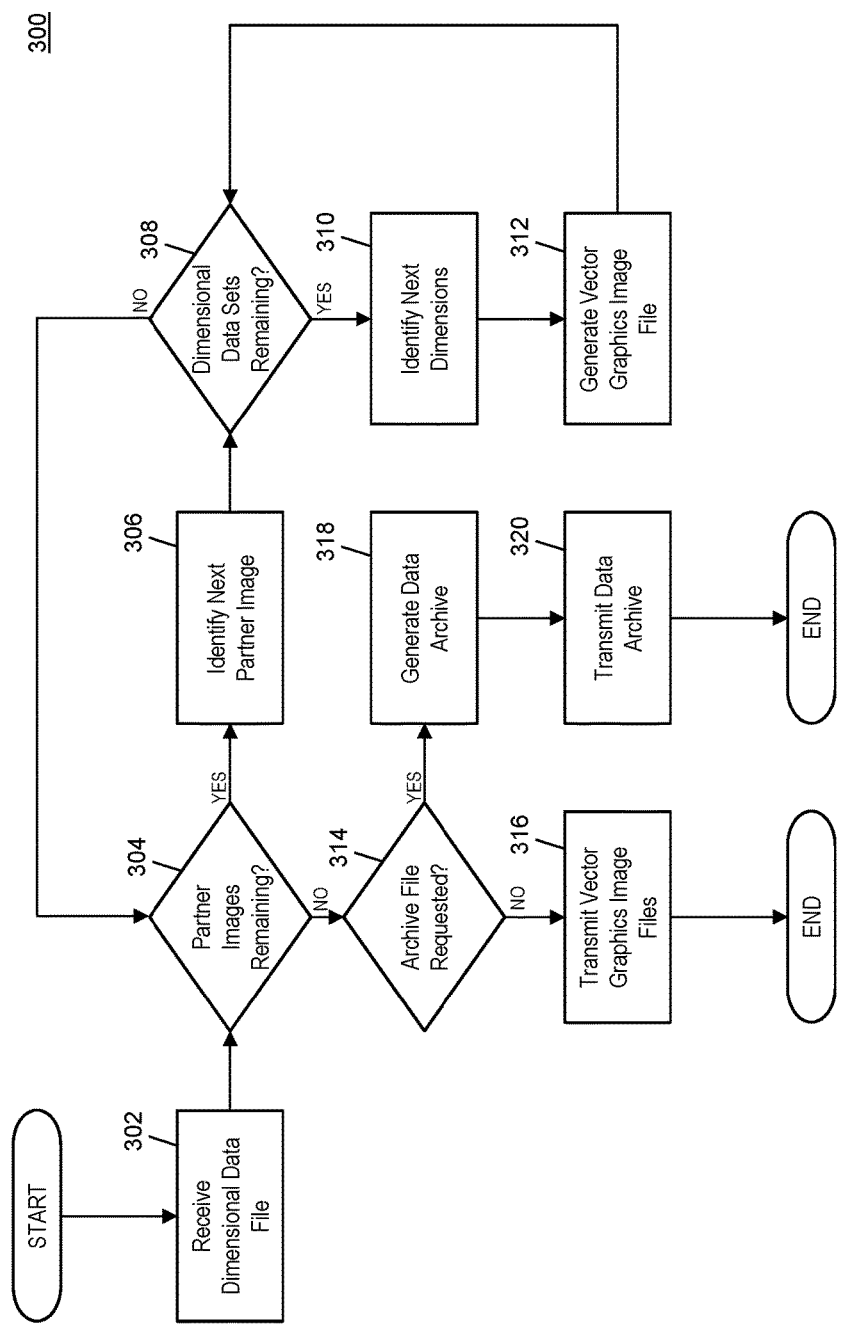
FIG. 3 is a flow diagram illustrating a process for the generation of a plurality of vector images based on a supplied data file by the processing server of FIG. 2 in accordance with exemplary embodiments.

FIG. 3 illustrates a process 300 for the automatic generation of vector graphic images based on a supplied data file by the processing server 102 as part of the system 100.

In step 302, the receiving device 202 of the processing server may receive a data file from the computing device 104 via the communication network 106, wherein the data file includes a plurality of dimensional data sets, each dimensional data set including at least a length and height. In step 304, the processing server 102 may determine if there are any partner images remaining for which vector images are requested. The determination may be based on partner image files being included in or accompanying the received data file. In cases where no partner images are supplied, the determination may still be positive for one iteration, to provide for generation of the vector graphic images once without any additional subject matter.

If the processing server 102 determines that there is at least one partner image remaining for which vector graphics are requested, then, in step 306, the processing server 102 may identify the next remaining partner image to be used. In step 308, the processing server 102 may determine if there are any dimensional data sets remaining for that partner image for which a vector image is requested. The determination may be based on if the image processing module 218 of the processing server 102 has already generated a vector image for each of the dimensional data sets included in the received data file. If there is at least one dimensional data set remaining, then, in step 310, the processing server 102 (e.g., the parsing module 216) may identify the next dimensional data set and the length and height included therein. In step 312, the image processing module 218 of the processing server 102 may generate a vector graphics image having the length and height specified in the dimensional data set and based on at least one base image file (e.g., stored in the memory 210 of the processing server 102 and identified via the querying module 214 thereof). In instances where a partner image file is supplied, the vector graphics image file may incorporate the partner image.

Once the vector image file has been generated, the process 300 may return to step 308 to determine if there are more dimensional data sets remaining that need vector images generating. Once all of the dimensional data sets have been processed, then the process 300 may return to step 304 to determine if vector images need to be generated for any more partner images supplied by the computing device 104. Once all requested images have been generated by the processing server 102, then, in step 314, the processing server 102 may determine if an archive file of the generated vector images is requested. Such a determination may be based on, for instance, data included in or accompanying the submitted data file, which may indicate if the computing device 104 requests an archive file of the images. If no such file is requested, then, in step 316, the transmitting device 222 of the processing server 102 may electronically transmit the generated vector graphic image files to the computing device 104 via the communications network 106. If an archive file is requested, then, in step 318, the generation module 220 of the processing server 102 may generate a data archive comprising each of the generated vector graphics image files. In step 320, the transmitting device 222 of the processing server 102 may electronically transmit the generated data archive to the computing device 104 via the communication network 106.

Example Generation of Vector Graphics Images

Figures 4A, 4B:
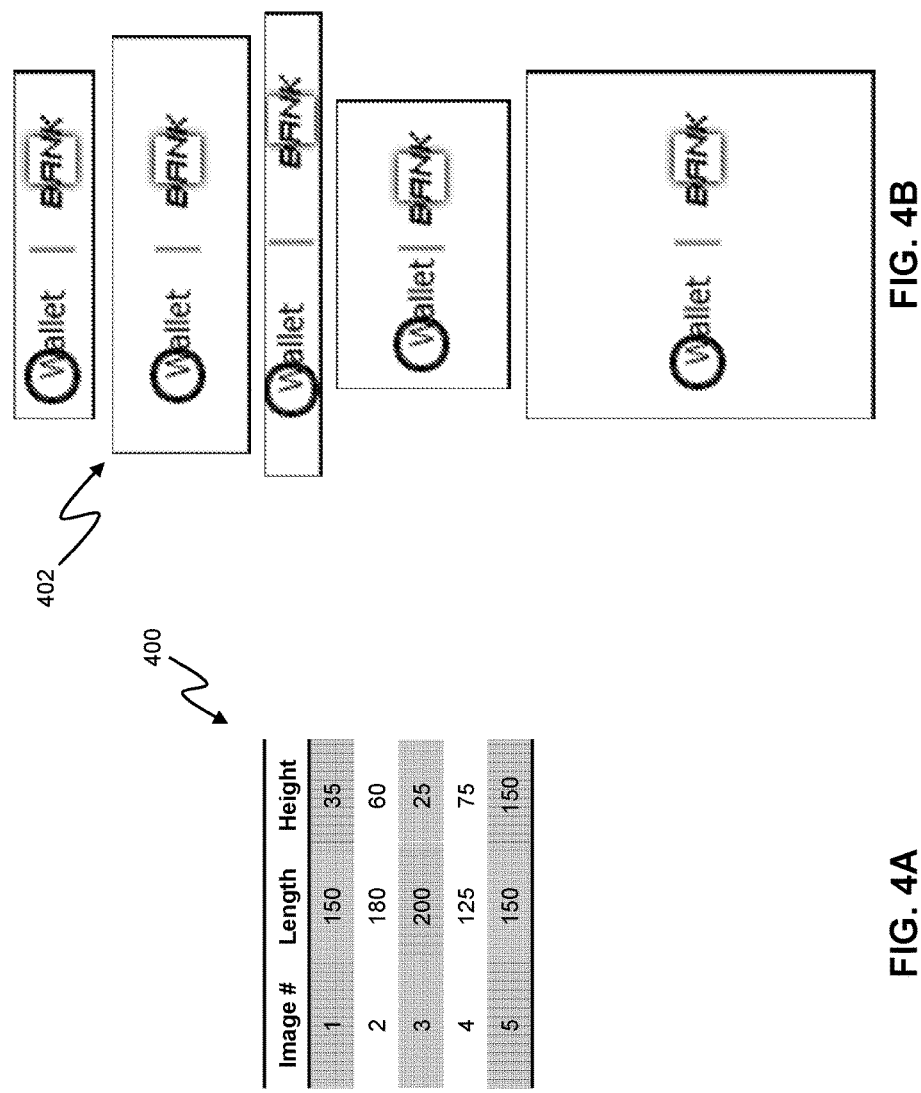
FIGS. 4A and 4B are diagrams illustrating a supplied data file and automatically generated vector images based thereon generated using the system of FIG. 1 in accordance with exemplary embodiments.

FIGS. 4A and 4B illustrate an example of the generation of a plurality of vector graphics images based on dimensional data sets included in a supplied data file as performed by the processing server 102 of the system 100.

FIG. 4A illustrates a data file 400 that may be received by the receiving device 200 as submitted by the computing device 104 via the communication network 106. The data file 400 may be a comma separated value file or of another suitable file format, and may include a plurality of dimensional data sets. In the illustrated example, the data file 400 includes five dimensional data sets. Each dimensional data set is comprised of a length and a height, corresponding to the dimensions requested for the corresponding vector image being requested by the computing device 104. The data file may be received by the receiving device 202 of the processing server 102 and parsed by the parsing module 216 thereof.

FIG. 4B illustrates a plurality of vector images 402, which may be generated by the image processing module 218 of the processing server 102. Each of the vector images 402 may be of dimensions specified by one of the dimensional data sets included in the data file 400. In the illustrated example, each of the vector images 402 corresponds directly to one of the dimensional data sets included in the data file 400, having a length and height matching those in the respective dimensional data set. Each of the vector images 402 also includes a logo and a partner image, where the logo may be a part of the base image used by the image processing module 218, and where the partner image may be supplied by the computing device 104, in the data file 400 or accompanying the data file 400 in the transmission made by the computing device 104.

Figure 5:
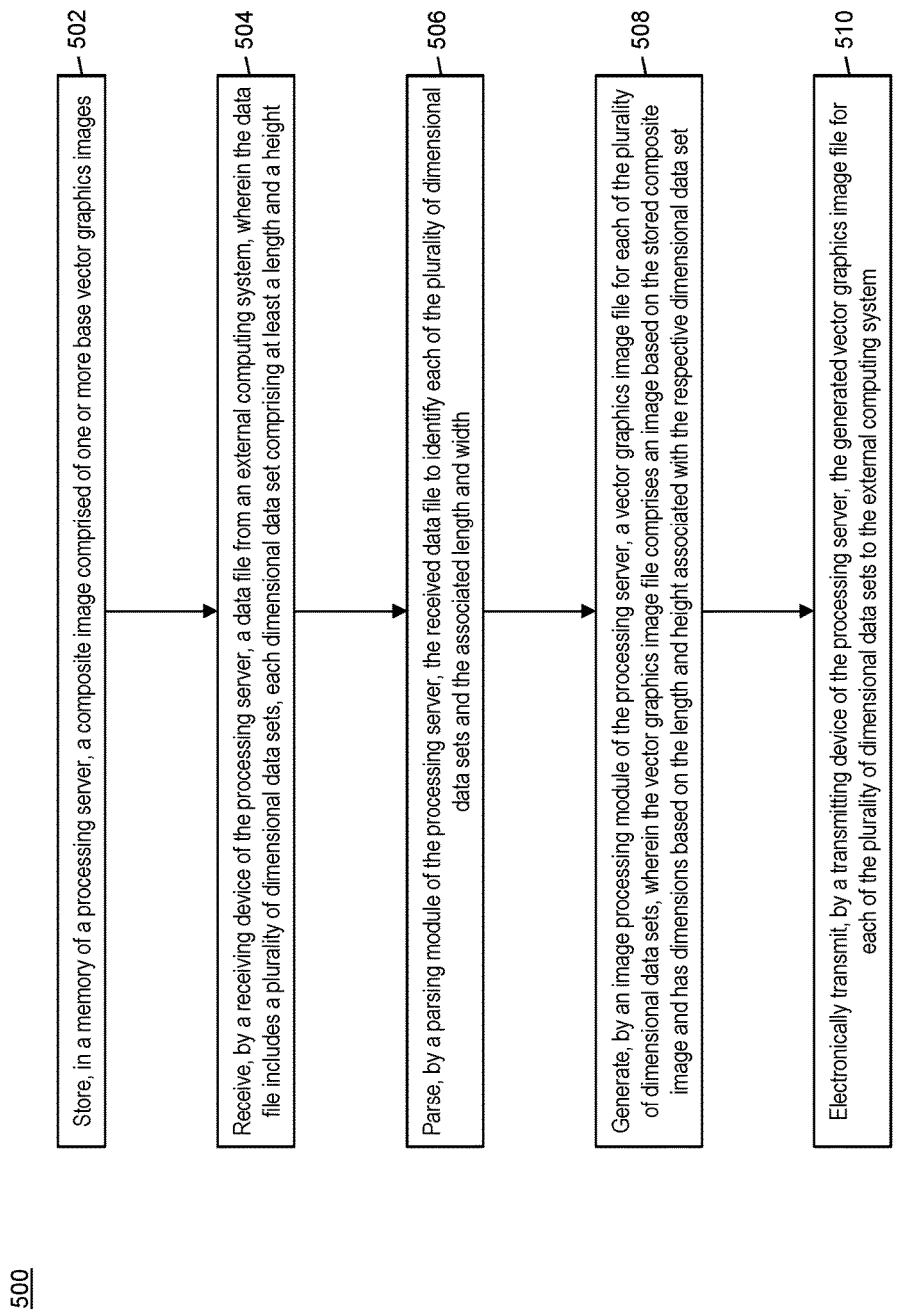
FIG. 5 is a flow chart illustrating an exemplary method for generating a plurality of vector images in accordance with exemplary embodiments.

Exemplary Method for Generating a Plurality of Vector Images with Specified Dimensions FIG. 5 illustrates a method 500 for the automatic generation of a plurality of vector images based on a base image and having dimensions corresponding to specifications in a received data file.

In step 502, a composite image comprised of one or more base vector graphics images may be stored in a memory (e.g., the memory 210) of a processing server (e.g., the processing server 102). In step 504, a data file may be received by a receiving device (e.g., the receiving device 202) of the processing server from an external computing system (e.g., the computing device 104), wherein the data file includes a plurality of dimensional data sets, each dimensional data set comprising at least a length and a height. In step 506, the received data file may be parsed by a parsing module (e.g., the parsing module 216) of the processing server to identify each of the plurality of dimensional data sets and the associated length and width.

In step 508, a vector graphics image file may be generated by an image processing module (e.g., the image processing module 218) of the processing server for each of the plurality of dimensional data sets, wherein the vector graphics image file comprises an image based on the stored composite image and has dimensions based on the length and height associated with the respective dimensional data set. In step 510, the generated vector graphics image file may for each of the plurality of dimensional data sets may be electronically transmitted to the external computing system by a transmitting device (e.g., the transmitting device 222) of the processing server.

In one embodiment, the method 500 may further include receiving, by the receiving device of the processing server, a partner image file from the external computing system, wherein the image comprising each generated vector graphics image file is further based on inclusion of the partner image file in the stored composite image. In a further embodiment, the method 500 may even further include repeating the receiving of a partner image file, generating of a vector graphics image file for each of the plurality of dimensional data sets, and electronic transmission of the vector graphics image files for a plurality of additional partner image files. In some embodiments, each vector graphics image file may be one of a: scalable vector graphics and encapsulated postscript vector graphics file format. In one embodiment, the received data file may be of a comma separated values file format.

In some embodiments, the method 500 may also include: generating, by a generation module (e.g., the generation module 220) of the processing server, an archive data file comprising each of the generated vector graphics image files; and electronically transmitting, by the transmitting device of the processing server, the generated archive data file to the external computing system. In a further embodiment, electronic transmission of the generated vector graphics image files may be satisfied by the electronic transmission of the generated archive data file. In one embodiment, the external computing system may be a web server (e.g., the web server 108) configured to display each of the generated vector graphics image files on a web page.

Computer System Architecture

Figure 6:
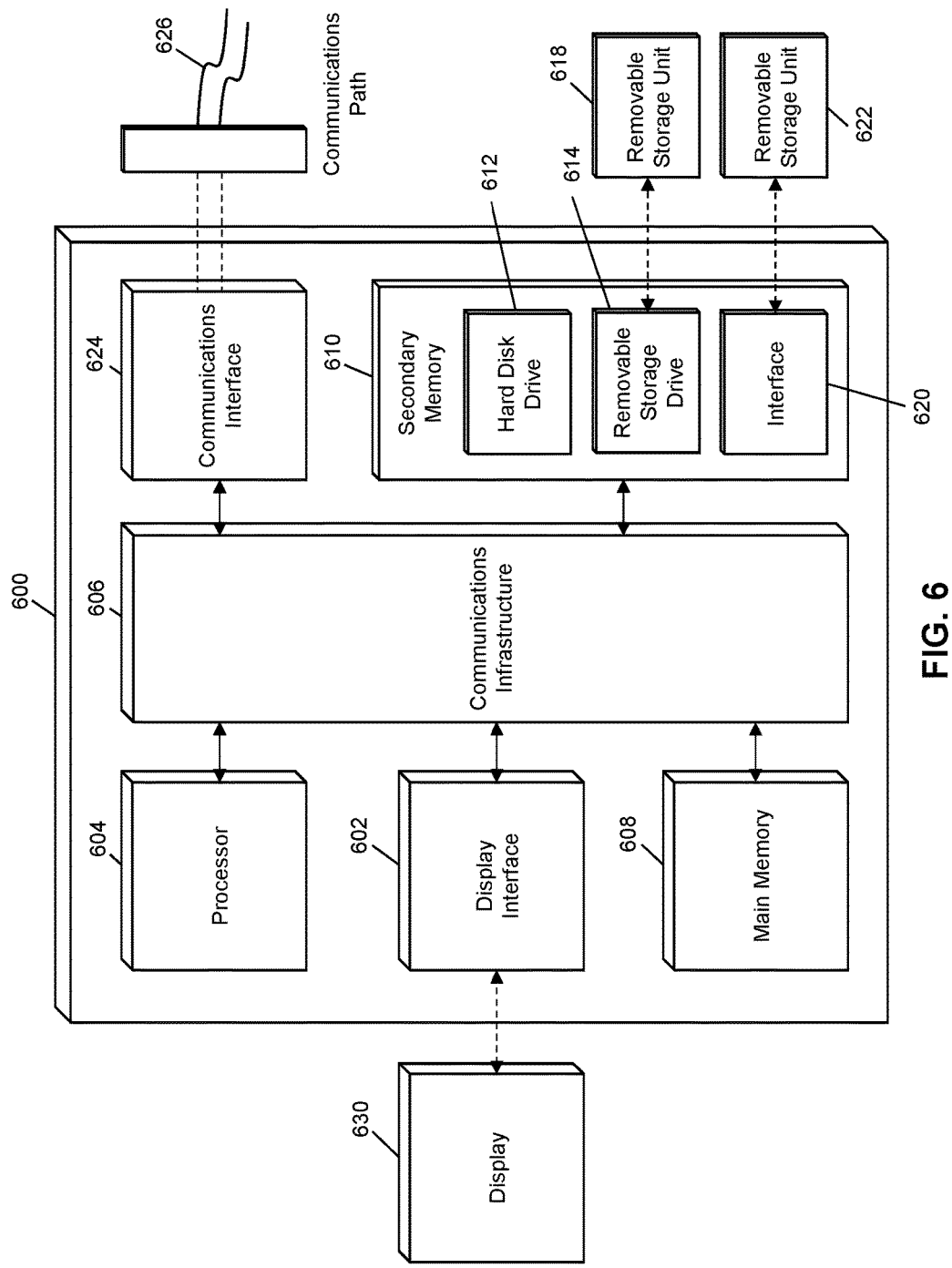
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3 and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for generating a plurality of vector images with specified dimensions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for generating a plurality of vector images with specified dimensions, comprising:
   storing, in a memory of a processing server, a composite image comprised of one or more base vector graphics images;
   receiving, by a receiving device of the processing server, a data file from an external computing system, wherein the data file includes a plurality of dimensional data sets, each dimensional data set comprising at least a length and a height;
   parsing, by a parsing module of the processing server, the received data file to identify each of the plurality of dimensional data sets and the associated length and height;
   generating, by an image processing module of the processing server, a vector graphics image file for each of the plurality of dimensional data sets, wherein the vector graphics image file comprises an image based on the stored composite image and has dimensions based on the length and height associated with the respective dimensional data set; and
   electronically transmitting, by a transmitting device of the processing server, the generated vector graphics image file for each of the plurality of dimensional data sets to the external computing system.

2. The method of claim 1, further comprising:
   receiving, by the receiving device of the processing server, a partner image file from the external computing system, wherein
   the image comprising each generated vector graphics image file is further based on inclusion of the partner image file in the stored composite image.

3. The method of claim 2, further comprising:
   repeating the receiving of a partner image file, generating of a vector graphics image file for each of the plurality of dimensional data sets, and electronic transmission of the vector graphics image files for a plurality of additional partner image files.

4. The method of claim 1, further comprising:
   generating, by a generation module of the processing server, an archive data file comprising each of the generated vector graphics image files; and
   electronically transmitting, by the transmitting device of the processing server, the generated archive data file to the external computing system.

5. The method of claim 4, wherein electronic transmission of the generated vector graphics image files is satisfied by the electronic transmission of the generated archive data file.

6. The method of claim 1, wherein each vector graphics image file is one of: scalable vector graphics and encapsulated postscript vector graphics file format.

7. The method of claim 1, wherein the received data file is of a comma separated values file format.

8. The method of claim 1, wherein the external computing system is a web server configured to display each of the generated vector graphics image files on a web page.

9. A system for generating a plurality of vector images with specified dimensions, comprising:

a memory of a processing server configured to store a composite image comprised of one or more base vector graphics images;

a receiving device of the processing server configured to receive a data file from an external computing system, wherein the data file includes a plurality of dimensional data sets, each dimensional data set comprising at least a length and a height;

a parsing module of the processing server configured to parse the received data file to identify each of the plurality of dimensional data sets and the associated length and height;

an image processing module of the processing server configured to generate a vector graphics image file for each of the plurality of dimensional data sets, wherein the vector graphics image file comprises an image based on the stored composite image and has dimensions based on the length and height associated with the respective dimensional data set; and a transmitting device of the processing server configured to electronically transmit the generated vector graphics image file for each of the plurality of dimensional data sets to the external computing system.

10. The system of claim 9, wherein the receiving device of the processing server is further configured to receive a partner image file from the external computing system, and the image comprising each generated vector graphics image file is further based on inclusion of the partner image file in the stored composite image.

11. The system of claim 10, wherein the receiving of a partner image file, generating of a vector graphics image file for each of the plurality of dimensional data sets, and electronic transmission of the vector graphics image files are repeated for a plurality of additional partner image files.

12. The system of claim 9, further comprising:

a generation module of the processing server configured to generate an archive data file comprising each of the generated vector graphics image files, wherein the transmitting device of the processing server is further configured to electronically transmit the generated archive data file to the external computing system.

13. The system of claim 12, wherein electronic transmission of the generated vector graphics image files is satisfied by the electronic transmission of the generated archive data file.

14. The system of claim 9, wherein each vector graphics image file is one of a: scalable vector graphics and encapsulated postscript vector graphics file format.

15. The system of claim 9, wherein the received data file is of a comma separated values file format.

16. The system of claim 9, wherein the external computing system is a web server configured to display each of the generated vector graphics image files on a web page.

* * * * *